United States Patent
Wolcott et al.

(10) Patent No.: US 8,693,530 B2
(45) Date of Patent: Apr. 8, 2014

(54) MODULATION ANALYSIS AND DISTORTION IDENTIFICATION

(75) Inventors: Lawrence D. Wolcott, Denver, CO (US); Phillip F. Chang, Langhorne, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 452 days.

(21) Appl. No.: 12/848,262

(22) Filed: Aug. 2, 2010

(65) Prior Publication Data

US 2011/0194597 A1    Aug. 11, 2011

Related U.S. Application Data

(60) Provisional application No. 61/301,835, filed on Feb. 5, 2010.

(51) Int. Cl.
    *H03H 7/40*      (2006.01)
(52) U.S. Cl.
    USPC ......................................................... 375/229
(58) Field of Classification Search
    USPC .................... 375/229, 232, 261, 285, 350
    See application file for complete search history.

(56) References Cited

U.S. PATENT DOCUMENTS

| | | | | |
|---|---|---|---|---|
| 6,556,239 B1 * | 4/2003 | Al-Araji et al. | | 348/192 |
| 6,671,334 B1 * | 12/2003 | Kuntz et al. | | 375/340 |
| 6,862,315 B1 * | 3/2005 | Garg et al. | | 375/232 |
| 6,947,502 B2 | 9/2005 | Taylor et al. | | |
| 7,142,609 B2 * | 11/2006 | Terreault et al. | | 375/261 |
| 8,284,828 B2 * | 10/2012 | Cooper et al. | | 375/232 |
| 2003/0109999 A1 * | 6/2003 | Stein et al. | | 702/86 |
| 2004/0100881 A1 | 5/2004 | Wakabayashi et al. | | |
| 2004/0153898 A1 | 8/2004 | Hidaka | | |
| 2006/0007997 A1 | 1/2006 | Jones | | |
| 2006/0121946 A1 | 6/2006 | Walton et al. | | |
| 2007/0109995 A1 | 5/2007 | Quigley et al. | | |
| 2007/0288982 A1 | 12/2007 | Donahue | | |
| 2008/0089224 A1 | 4/2008 | Kim et al. | | |
| 2008/0276111 A1 | 11/2008 | Jacoby et al. | | |

(Continued)

FOREIGN PATENT DOCUMENTS

JP            04208707 A      7/1992

OTHER PUBLICATIONS

DOCSIS200 Best Practices and Guidelines Proactive Network Maintenance Using Preequalization CM-GL-PNMP-V01-100415; Apr. 15, 2010.

(Continued)

*Primary Examiner* — Khanh C Tran
(74) *Attorney, Agent, or Firm* — Banner & Witcoff Ltd

(57) ABSTRACT

An apparatus, method, computer readable medium, and system are provided to generate a symbol placement associated with a transmission scheme by transforming a retrieved set of equalization coefficients. Symbols included in the symbol placement may be analyzed and quantified in terms of their distance from a decision boundary. Symbols may be synthesized on an iterative basis in order to obtain visibility into the underlying performance of the transmission scheme over time. If equalization is unable to reduce a signal impairment below a threshold value within a predetermined amount of time, then a determination may be made that a non-linear distortion source is present in a network or communication system. Signals received from a plurality of user terminals may be compared with one another in order to determine a probable location or cause of the non-linear distortion.

19 Claims, 10 Drawing Sheets

(56) References Cited

U.S. PATENT DOCUMENTS

| | | |
|---|---|---|
| 2010/0095360 A1 | 4/2010 | Pavlovski et al. |
| 2010/0223650 A1 | 9/2010 | Millet et al. |
| 2011/0026577 A1 | 2/2011 | Primo et al. |

OTHER PUBLICATIONS

Document titled "VSWR, or Voltage Standing Wave Ratio"; prior to Nov. 11, 2010.

Cablelabs invention disclosure titled "Pre-Equalization based proactive network maintenance process model", prior to Nov. 1, 2010.

U.S. Appl. No. 12/917,001, filed Nov. 1, 2010, Determining Response Signature Commonalities.

U.S. Appl. No. 12/848,335, filed Aug. 2, 2010, Identification of a Fault.

U.S. Appl. No. 13/155,464, filed Jun. 8, 2011, Inducing Response Signatures in a Communication Network.

"VSWR, or Voltage Standing Wave Ratio", available at http://emc.toprudder.com/vswr.pdf (last visited Nov. 22, 2010).

Melissa Ray Weimer, "Waveform Analysis Using the Fourier Transform", DATAQ Instruments, Inc., available at http://www.dataq.com/applicat/articles/an11.htm (last visited Nov. 22, 2010).

Rob Thompson et al., "Optimizing Upstream Throughput Using Equalization Coefficient Analysis", Motorola Home & Networks Mobility.

Robert L. Howald et al., "Characterizing and Aligning the HFC Return Path for Successful DOCSIS 3.0 Rollouts", SCTE Cable-Tec Expo, Denver, CO, Oct. 28-30, 2009.

Robert L. Howald et al., "Docsis 3.0 Upstream: Readiness & Qualification".

DOCSIS® Best Practices and Guidelines Proactive Network Maintenance Using Preequalization CM-GL-PNMP-V01-100415; Apr. 15, 2010.

Document titled "VSWR, or Voltage Standing Wave Ratio"; prior to Nov. 1, 2010.

Cablelabs invention disclosure titled "Pre-Equalization based proactive network maintenance process model"; prior to Nov. 1, 2010.

Hranac, R., "Linear Distortions part 1," downloaded Apr. 22, 2010.

Qureshi, S.U.H., "Adaptive Equalization," Proceedings of the IEEE, Sep. 1985.

Cablelabs invention disclosure titled "A Simple algorithm for fault localization using naming convention and micro-reflection signature"; prior to Nov. 1, 2010.

Thompson, R. et al., "Optimizing Upstream Throughput Using Equalization Coefficient Analysis"; prior to Nov. 1, 2010.

* cited by examiner

MODULATION ANALYSIS AND DISTORTION IDENTIFICATION

RELATED APPLICATIONS

The present application is related to, incorporates by reference, and claims the priority benefit of U.S. Provisional Patent Application No. 61/301,835, entitled "Modem Signal Usage and Fault Isolation", filed Feb. 5, 2010.

FIELD OF ART

The features described herein generally relate to providing users with access to content over a network. More specifically, aspects of the disclosure describe identifying the likely or approximate location of a potential problem or error associated with a network.

BACKGROUND

Service providers and network operators strive to provide quality service to users. In the context of networks, signal degradation may pose significant challenges in providing quality service. For example, interference in return path RF frequencies is the most common cause of upstream transmission failure. Connection-oriented protocols, such as TCP, will typically retransmit lost packets. However, real-time streaming protocols used in voice and video do not. The loss of upstream packets results in poor quality voice and video experience from a user perspective. QAM analysis provides a meaningful capability to identify and resolve return path signal impairments.

Packages composed of hardware and software are available to characterize an upstream communication channel. However, such packages are expensive to purchase, license and maintain, require specialized skills to install, operate and maintain, are band-limited to a finite number of connections and require rack space and power, and typically result in user down-time when hardware is installed or sweeps are in progress. Improved and advanced techniques are needed in order to accurately, efficiently, and quickly characterize upstream communication channels.

SUMMARY

This summary is not intended to identify critical or essential features of the disclosure provided herein, but instead merely summarizes certain features and variations thereof.

In some embodiments, pre-equalization coefficients may be used in conjunction with Fourier analysis to derive an inverse channel response of a return path spectrum. Amplitude-to-frequency and phase-to-frequency distortion characteristics may be used to synthesize an iteration of quadrature amplitude modulation (QAM) symbols. The QAM symbols may demonstrate radial tilt and voltage dispersion caused by underlying distortion sources in transmission.

The equalization coefficients may be indicative of samples of a signal taken at discrete periods of time. Each sample may coincide with a tap of a tap-delay filter. For example, the main-tap may coincide with a signal from a user terminal at a discrete instant in time and the other taps may represent prior or future samples of the signal relative to the main-tap. In some embodiments, one or more processors associated with one or more devices may execute instructions stored in a memory to implement the tap-delay filter, to establish equalization coefficients, and to analyze the equalization coefficients.

In some embodiments, a symbol placement associated with a transmission scheme may be generated or synthesized by transforming the equalization coefficients. Symbols included in the symbol placement may be analyzed and quantified in terms of their distance from a (demodulation) decision boundary. Symbols may be generated on an iterative basis in order to obtain visibility into the underlying performance of the transmission scheme over time. In some embodiments, if equalization is unable to reduce a signal impairment below a threshold value, then a determination may be made that a non-linear distortion source is present in a network or communication system. Signals received from a plurality of user terminals may be compared with one another in order to determine a probable location or cause of the non-linear distortion.

Other details and features will also be described in the sections that follow.

BRIEF DESCRIPTION OF THE DRAWINGS

Features of this disclosure will become more apparent upon a review of the disclosure in its entirety, including the drawing figures provided herewith, the contents of which are fully incorporated herein by way of reference.

Some features herein are illustrated by way of example, and not by way of limitation, in the figures of the accompanying drawings and in which like reference numerals refer to similar elements.

DETAILED DESCRIPTION

It is noted that various connections between elements are discussed in the following description. It is noted that these connections are general and, unless specified otherwise, may be wired or wireless, direct or indirect, and that this specification is not intended to be limiting in this respect.

Figure 1:
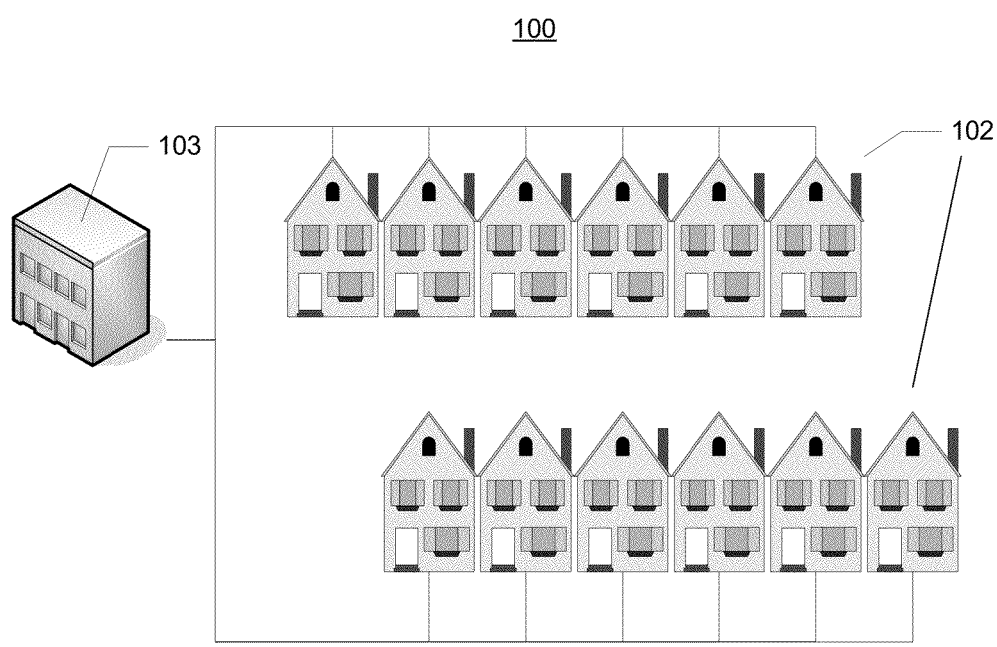
FIG. 1 illustrates an example information distribution system.

FIG. 1 illustrates an example information distribution network 100 on which many of the various features described herein may be implemented. Network 100 may be any type of information or content distribution network, such as satellite, optical fiber, coaxial cable, telephone, cellular, wireless, etc. The network may be a hybrid fiber/coax distribution network found in many television networks. Such networks 100 may use a series of interconnected communication lines 101 to connect multiple homes 102 to a provider's facility, headend, or central location 103. The central location 103 may transmit downstream information signals onto the lines 101, and each home 102 may have a tuner used to receive and process those signals. Signals may also include upstream transmissions from homes 102 to central location 103.

The lines 101 may be a series of interconnected lines of different type, such as optical fiber and/or coaxial cables, or wireless links. There may be one line originating from the central location 103, and it may be split a number of times to distribute the signal to various remote sites such as homes 102 in the vicinity (which may be many miles) of the central location 103. The lines 101 may include components not illustrated, such as splitters, filters, amplifiers, etc. to help convey the signal clearly. Portions of the lines 101 may also be implemented with fiber-optic cable, resulting in a hybrid fiber/cable (HFC) network of lines 101. By running fiber optic cable along those portions, signal degradation in those portions may be significantly minimized, allowing a single central location 103 to reach even farther with its network of lines 101 than before. Portions of lines 101 may also be implemented via wireless links.

Figure 2:
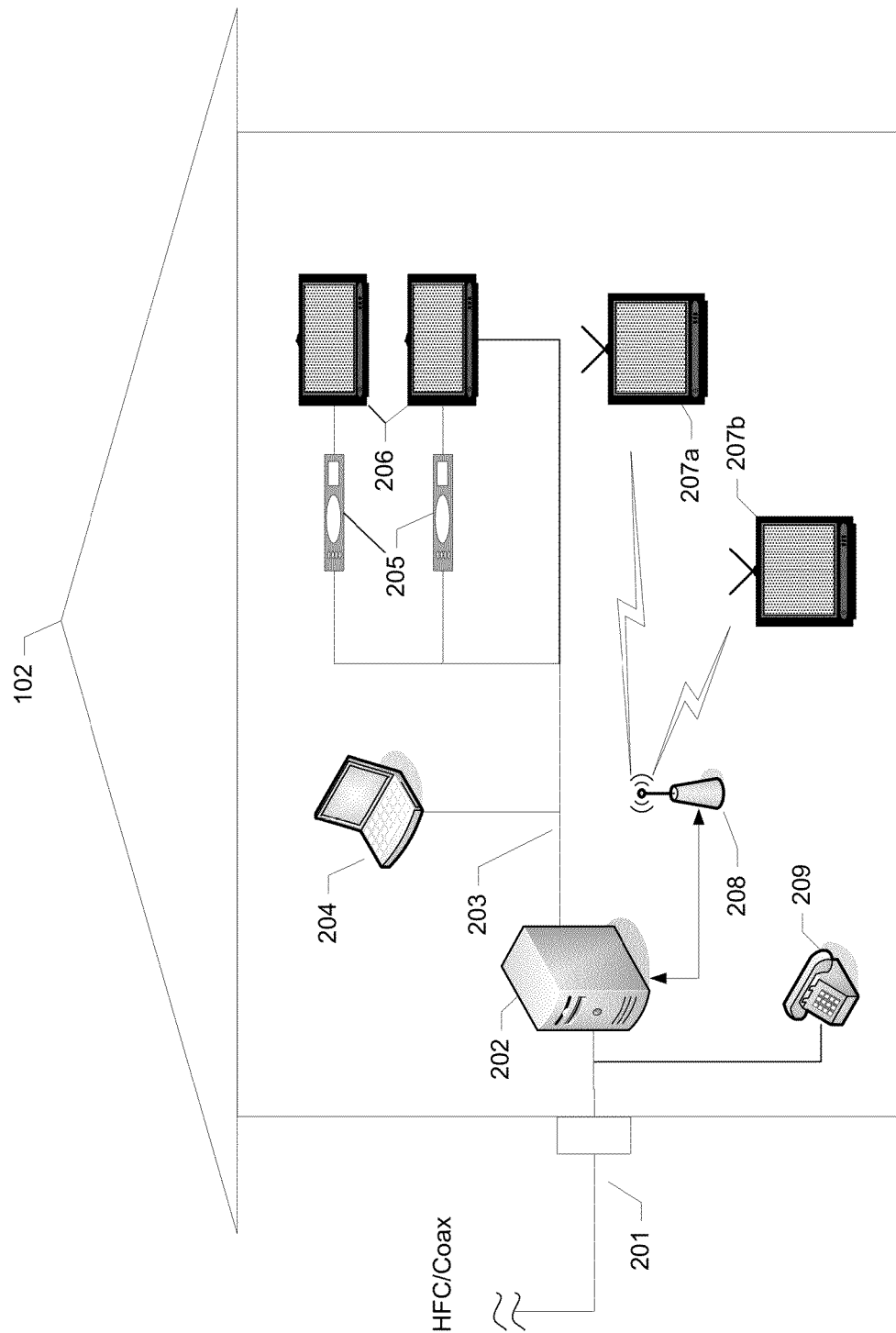
FIG. 2 illustrates an example architecture, with a closer level of detail on one of the premises illustrated in the FIG. 1 network.

FIG. 2 illustrates a closer view of one of the remote sites, home 102 from FIG. 1. As illustrated, the home may be connected to the network 100 by, for example, wireless optical fiber or coaxial cable feed 201. The feed may be connected to a gateway device 202, which may serve as an interface between the devices within the home 102, and the external devices out on the network 100. The gateway itself may include tuners, modulators, demodulators, etc. to communicate out on the network 100, and may also include interface components to communicate with the devices in the home.

As for the network in the home, the specific types of components may vary, depending on the type of communication network used in the home. One example may be an Internet Protocol network 203 carried over the home's internal coaxial wiring under the MoCA (Multimedia Over Coax Alliance) standard. To this end, the gateway 202 may be an IP transport gateway, using IP communications to communicate with the devices in the home, and with devices outside the home (e.g., via a DOCSIS CMTS in a HFC-type network, for example). Other networks, such as fiber optic or wireless networks, may alternatively be used.

Various devices may communicate on the network in the home. For example, one or more personal computers 204 may use the gateway 202 to communicate with other devices on the Internet. Customer premises equipment (CPE) 205, such as televisions or set-top boxes (STBs), may receive IP distribution of video content received at the gateway 202, and convert that video content into a format suitable for display on corresponding display devices 206, such as televisions, monitors, handheld devices, etc. Alternatively, display devices 206 may incorporate functionality of premises equipment 205. For example, the CPE 205 may receive an MPEG2 stream of video, and may process that stream to generate an HDMI (High Definition Multimedia Interface) output signal to each CPE 205 or corresponding display device 206. While STBs are described below, one skilled in the art would appreciate that devices in addition to, or in lieu of STBs, such as personal computers (PCs), servers, gateways, etc., may be used in some embodiments.

Some display devices in the home, however, might not have their own CPE. Or they might not have the circuitry needed to decode the MPEG2 stream of video received at the gateway 202. For example, display devices such as televisions 207a and 207b might be old-fashioned analog televisions, having tuners configured to tune to the analog broadcast channels defined by the NTSC (National Television System Committee). Or they may be digital televisions not equipped to receive and decode the latest form of digital compression or modulation used on the network 100. To support such legacy devices, the gateway 202 may include a local wireless transmitter 208.

The local wireless transmitter 208 may be configured to transmit a low-power radio frequency channel carrying video signals of a selected program for local reception within the home. For example, if the television 207a is an analog television, the gateway 202 may use the transmitter 208 to transmit a selected program as an NTSC video signal on an NTSC Channel (e.g., channel 2). That channel and signal can be tuned by the television 207a, and displayed for the user's consumption. In this manner, legacy devices may continue to be used even if transmission techniques advance. The transmitter 208 may use any desired wireless format, such as IEEE 802.11, ZIGBEE, BLUETOOTH, etc. An 802.11 transmitter 208 may be especially useful, since the 2.4 GHz range of that standard happens to overlap the 300 MHz-3 GHz frequency range of the NTSC UHF channels.

Any number and type of devices (e.g., computers, mobile devices, modems, telephones, set top boxes, etc.) may be located within the network of FIGS. 1 and 2. Those devices located at a user's premises, such as home 102, may generally be referred to as user terminals.

Figure 3:
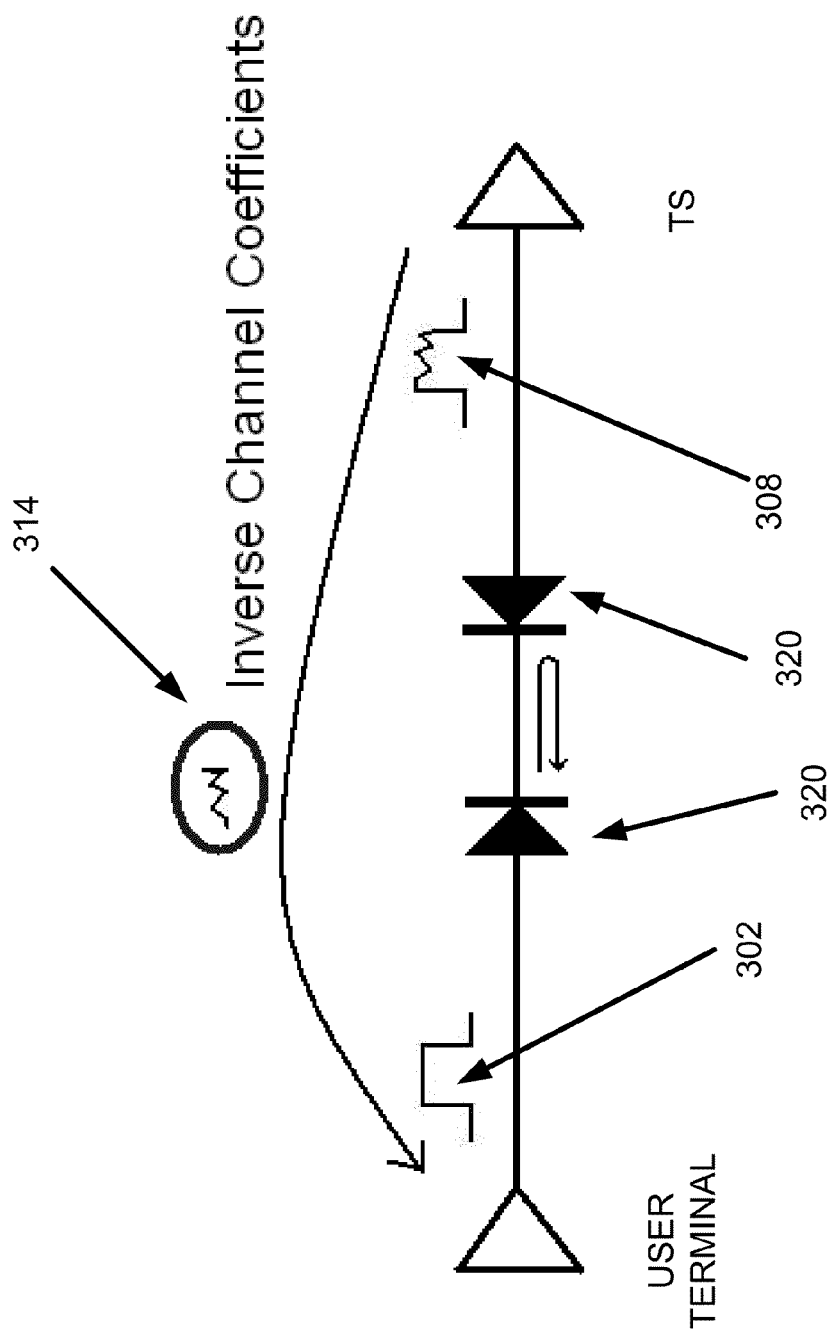
FIG. 3 illustrates a logic diagram for demonstrating how to determine values for equalization coefficients in connection with one or more aspects of this disclosure.

By way of introduction, FIG. 3 illustrates a simplified logic diagram connecting a user terminal, such as a computer or modem, to another device, such as a termination system (TS). In FIG. 3, the user terminal transmits a signal 302 (e.g., a square wave) to the TS. In an ideal operating environment, upon receipt at the TS, signal 308 would be identical to signal 302. However, as shown in FIG. 3, signal 308 includes ripple not present in signal 302 due to distortion. The distortion may be present in the communication channel (e.g., due to an impedance cavity as illustrated via components 320) coupling the user terminal and TS, or the source of the distortion may be present in one or both of the user terminal and the TS. In any event, the TS may provide the user terminal with a set of channel coefficients (illustrated as signal 314 in FIG. 3) that correspond to the inverse of the frequency response associated with the communication from the user terminal to the TS. In this manner, the user terminal may pre-distort future signal transmissions, such that when the signals are received at the TS, the received signals are ideal in terms of amplitude and phase over the operating frequency range.

Given that the frequency response associated with the communication channel or devices may change over time, a new or updated set of coefficients may be communicated to the user terminal periodically (e.g., once every thirty seconds). This periodic update may be scheduled to occur when the user terminal is in an idle state. In some embodiments, the TS may analyze predetermined data fields associated with each, or a subset of every, data transmission from the user terminal for purposes of updating the coefficients.

The equalization coefficients may be useful for correcting linear distortions. Linear distortions may be those distortions that impact the amplitude and/or phase of an original signal and tend to generally be present over time. Micro-reflections (which, as seen by a receiver, may be a copy of a transmitted signal arriving late and with a reduced amplitude), amplitude distortion (which may represent undesirable variation in a communication channel's amplitude response and may result in distortion of a signal's amplitude), and group delay variation (which may represent undesirable variation in a communication channel's phase response and may result in distortion of a signal's phase or a variation in the propagation of frequency components of the signal across the channel) are examples of linear distortions. Non-linear distortions may be those distortions that generate distortion components, including harmonics of the original signal or multiples of the original signal with other energy present in a return band. Examples of non-linear distortions are ingress and noise. Techniques for detecting and handling linear and non-linear distortions are described further below.

As described in the incorporated U.S. Provisional Patent Application No. 61/301,835, a data collection apparatus may be used to retrieve or gather pre-equalization coefficients from one or more devices (e.g., user terminals (such as modems), a server, a termination system (TS) such as a cable modem termination system (CMTS), etc.). The coefficients may be parsed, normalized, and analyzed using Fourier transformation to derive amplitude and phase components. The amplitude and phase components can be derived from a time domain representation, which can be used to synthesize or approximate a symbol placement in connection with a transmission scheme. For example, in the context of conveying symbols using quadrature amplitude modulation, such as 64-QAM, every bit pattern corresponding to the sixty-four (64) possible symbols can be synthesized. Multiple (e.g., a number 'n') iterations can be conducted to achieve a (gaussian) scatter. Such techniques may be applied with respect to a single communication channel (e.g., in relation to communications from a first device, such as a user terminal, and a second device, such as a TS). The techniques may also be applied across a plurality of communication channels or devices (e.g., multiple user terminals in communication with one or more other devices, such as a TS). For example, an in-home service repairman or installer may be interested in the channel characteristics associated with a particular user terminal, whereas a line operator may be more concerned with the performance of all (or a subset of) the user terminals in the communication system.

Figure 4A:
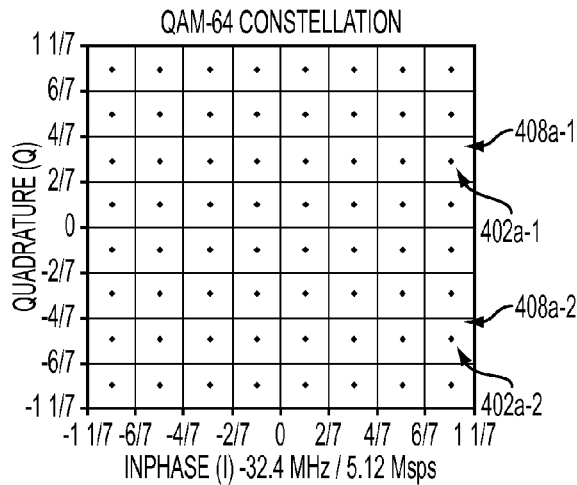
FIGS. 4A-4D illustrate constellation diagrams/patterns in connection with one or more aspects of this disclosure.

FIGS. 4A-4D (collectively referred to as FIG. 4) illustrate a (64-QAM) constellation pattern that may be used to represent the impact that distortion has in terms of demodulated symbol recognition/detection at a receiver. FIG. 4A represents an ideal symbol placement when no distortion sources are present. As shown in FIG. 4A, the symbols (two of which are labeled as 402a-1 and 402a-2) reside at the center of each of the sixty-four (64) boxes (two of which are labeled 408a-1 and 408a-2).

Figure 4B:
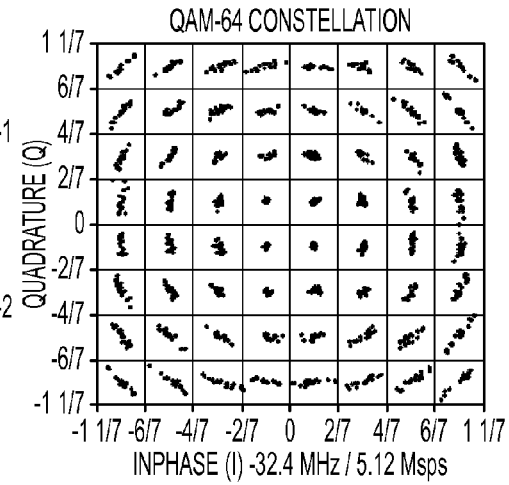
Figure 4D:
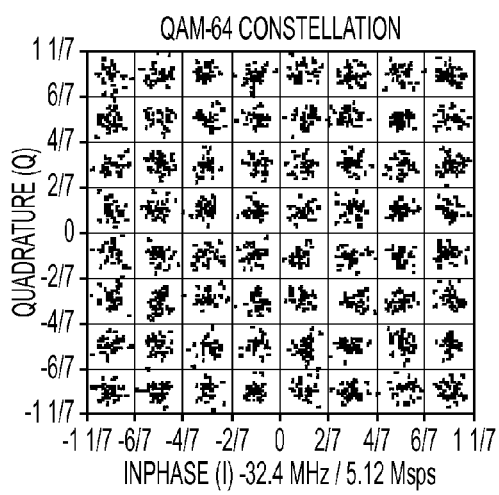
Figure 4C:
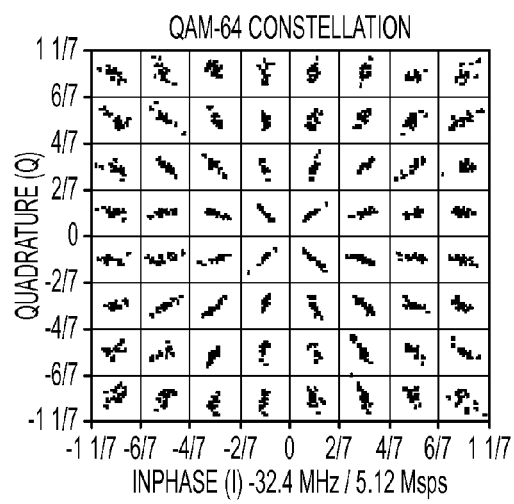

FIGS. 4B and 4C represent the effect of phase and amplitude distortion, respectively, on the demodulated symbols. Phase distortion is frequently described in terms of group delay distortion, which represents the change in the phase of a signal relative to the frequency components of the signal. When group delay distortion is present, the frequencies transmitted in the system or network are not transmitted in the same amount of time—that is, with equal time delay. For example, in the context of equalizer coefficients implementing a bandpass filter, the delay may be less towards the center of the filter's passband relative to the filter's band edges. Amplitude distortion relates to a change of the magnitude of a received signal relative to the magnitude of the transmitted signal. If the magnitude of the received signal is larger than the magnitude of the transmitted signal, then the distortion is said to be constructive in nature. Conversely, if the magnitude of the received signal is less than the magnitude of the transmitted signal, then the distortion is said to be destructive in nature.

FIG. 4D represents a typical symbol placement in the presence of distortion, taking into consideration both phase and amplitude distortion. Relative to the ideal symbol placement in FIG. 4A, the symbols in FIG. 4D do not reside in the exact centers of each of the sixty-four (64) boxes. Instead, as shown in FIG. 4D, the symbols take on a scattered appearance and may be characterized by a scatter-distribution function. A result of this scatter is a reduction in terms of noise margins associated with the decision boundaries (e.g., the perimeters) of each of the sixty-four (64) boxes, which increases the likelihood of incurring a symbol error at the receiver.

The description provided above in connection with FIGS. 4A-4D relates to the use of a 64-QAM modulation scheme. Other n-QAM schemes (e.g., 16-QAM, 256-QAM, etc.) may be used in some embodiments. In some embodiments, other modulation schemes (e.g., amplitude modulation, frequency modulation, etc.) may be used in addition to, or as an alternative for, n-QAM.

Figure 5:
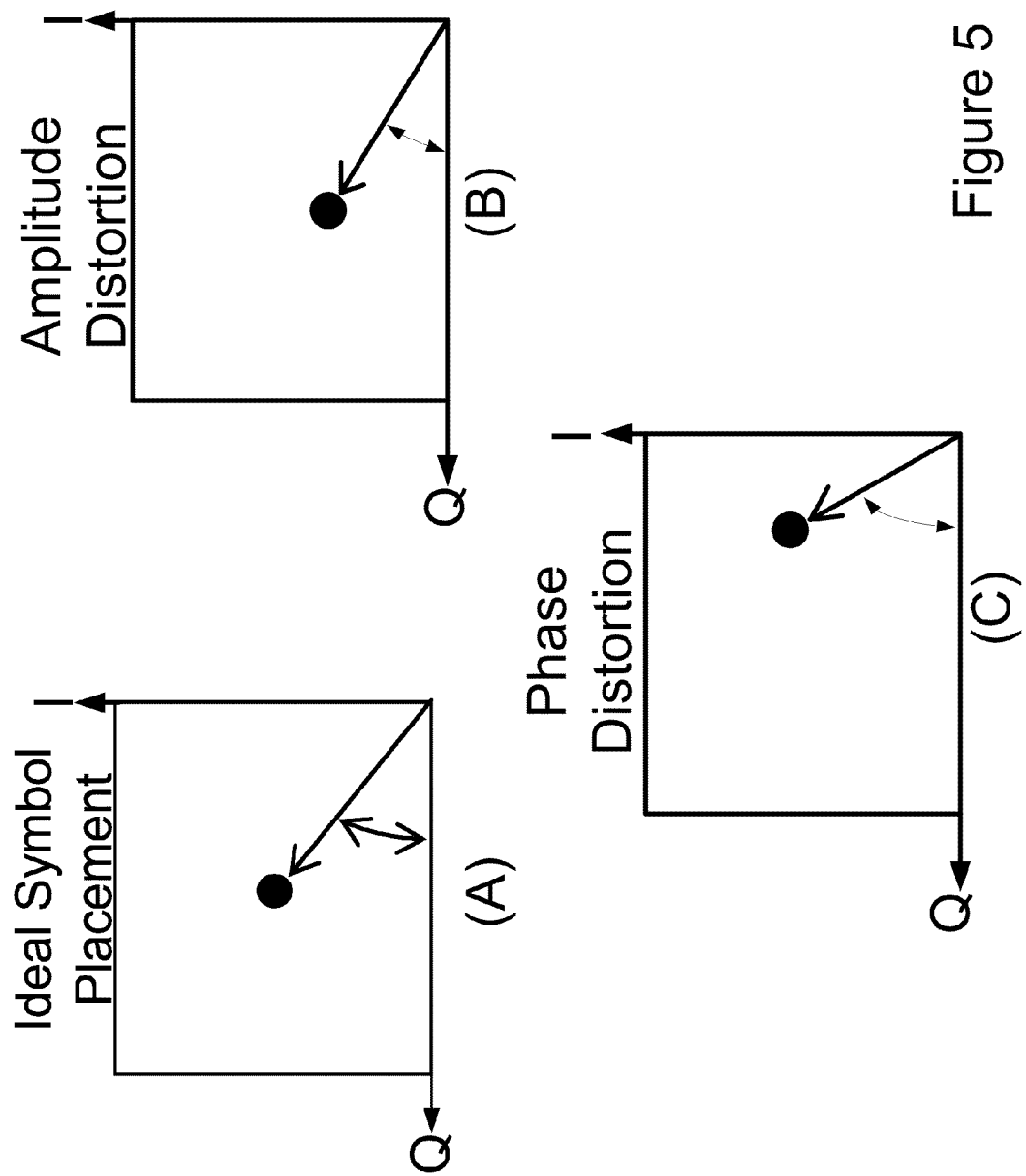
FIGS. 5A-5C illustrate a closer view of a portion of a constellation diagram in connection with one or more aspects of this disclosure.

In terms of the constellation patterns shown in FIGS. 4A-4D, a symbol's location may be referenced by its in-phase and quadrature components. FIGS. 5A-5C (collectively referred to as FIG. 5) illustrate one (1) of the sixty-four (64) boxes of FIGS. 4A-4D. As shown in FIG. 5, the in-phase (I) component resides along the vertical axis, and the quadrature (Q) component resides along with horizontal axis. FIG. 5 is illustrative; other coordinate or reference systems may be used in some embodiments.

FIG. 5A illustrates an ideal symbol location indicative of either a lack of distortion or the presence of distortion sources that cancel one another out. In the presence of amplitude distortion, the symbol would tend to move closer to the 'Q' axis (relative to the ideal symbol placement) as shown in FIG. 5B. In the presence of phase distortion, the symbol would tend to move closer to the 'I' axis (relative to the ideal symbol placement) as shown in FIG. 5C.

FIGS. 4 and 5 are representations of the symbol locations as provided in a constellation pattern for purposes of visualizing the symbol-space. A calculation of a modulation error ratio (MER) may be conducted in conjunction with the constellation patterns of FIGS. 4 and 5 to characterize symbol placement. Modulation error ratio may represent the ratio of average symbol power to average error power. An equation for calculating MER is as follows:

$$MER \text{ (dB)} = -10 * \log10\left\{ \frac{\sum_{i=1}^{n}(\delta I_i^2 + \delta Q_i^2)}{\sum_{i=1}^{n}(I_i^2 + Q_i^2)} \right\}$$

where $$\delta Q = \sqrt{\sum_{i=1}^{n} \frac{(A_i \sin\alpha_i + \phi_i \cos\alpha_i)^2}{n}}$$

$$\delta I = \sqrt{\sum_{i=1}^{n} \frac{(\phi_i \sin\alpha_i + A_i \cos\alpha_i)^2}{n}}$$

In terms of the MER equation shown above, the in-phase (I) and quadrature (Q) components of the ideal symbol placements are known based on the modulation scheme used. A Fourier transform computation provides the inverse distortion of the amplitude (A) and phase (Φ) respective of frequency. A root-mean-square (RMS) calculation of the amplitude and phase distortion provides the in-phase delta (δI) and quadrature delta (δQ) values for each symbol (n), where α represents the amplitude/phase vector angle (radius). Using the MER equation, a quantified value may be obtained that may be used, for example, to determine how to prioritize resolving (potential) problems or issues. For example, a network operator or provider may allocate resources (e.g., personnel and tool sets) to those portions of a network having the lowest MER (and thus, the highest average error power relative to the average symbol power).

The difference between the ideal symbol location at the center of a given box and the actual location of the symbol is referred to as an error vector. The distance from the center of the box may be referred to as the error vector magnitude (EVM). The EVM may be calculated as follows:

$$EVM = 100\% * \sqrt{\frac{\frac{1}{n}\sum_{i=1}^{n}(\delta I_i^2 + \delta Q_i^2)}{SE^2}}$$

Figure 6:
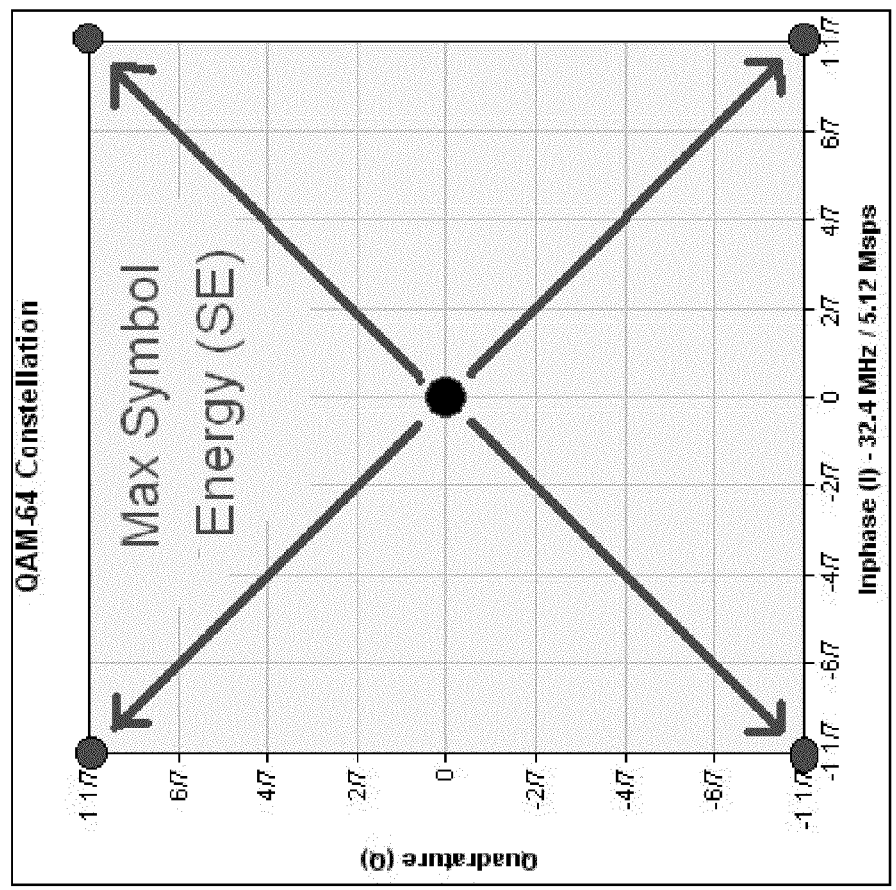
FIG. 6 illustrates a representation of maximum symbol energy in connection with one or more aspects of this disclosure.

The terminology used in the EVM equation is the same as the terminology discussed above with respect to the calculation of MER. 'SE' represents the maximum symbol energy and is calculated from the outer corners of an I-Q constellation as shown in FIG. 6. $SE^2 = I^2_{max} + Q^2_{max}$, where $I_{max}$ is the real component of the outermost constellation symbol in the constellation diagram, $Q_{max}$ is the imaginary component of the outermost constellation symbol in the constellation diagram, and the outermost constellation symbol is the symbol with the highest power.

The above-described techniques are effective in determining the impact of linear distortion on symbol placement. Stated in a slightly different way, the above techniques may be used to quantify the impact that linear distortion sources have on symbol placement. Linear distortions may be transformative in nature and may create standing-wave types of impairments. The linear distortions may be accounted for by pre-distorting transmissions from the user terminal in accordance with the inverse channel response associated with the communication system. For example, equalization coefficients may be used to pre-distort a signal transmission from a user terminal to a TS on an upstream communication channel.

As described above, non-linear distortion sources (e.g., ingress and noise) may also be present in a communication network. Whereas the linear distortions may tend to be transformative in nature, non-linear distortion sources may tend to be additive in nature. Use of a pre-distorting mechanism (such as equalization coefficients) may help to mitigate the effects of the non-linear distortion in terms of symbol demodulation/recognition at a receiver. However, the use of a pre-distorting mechanism may also tend to increase or amplify the effects of the non-linear distortion in terms of symbol demodulation/recognition at a receiver.

Given that non-linear distortion sources may be spurious or intermittent in nature, a technique may be used to determine the likely presence of a non-linear distortion. For example, as described in the incorporated U.S. Provisional Patent Application No. 61/301,835, standing wave and steady-state interference that may be indicative of a linear distortion may typically be equalized within a relatively short period of time (e.g., 30 seconds). Non-linear distortions, such as noise, common path distortion (CPD) and impulse may demonstrate a frequency response signature that never completely equalizes. Equalization coefficients may be collected, subjected to a Fourier transformation, and analyzed in the aggregate for signal impairments. Amplitude, group and phase delay may be measured for Voltage Standing Wave Ratio (VSWR) or any other type of parameter to quantify a wave magnitude or ratio.

If subsequent equalization (by way of coefficient replacement or coefficient combination techniques, such as averaging or convolution) fails to reduce the wave ratio, this may indicate the presence of non-linear distortion sources.

The likely existence of a non-linear distortion source may be determined based on whether equalization eliminates or reduces a wave ratio value within a predetermined amount of time (e.g., within a relatively short amount of time). Furthermore, techniques described herein can also be used to provide an approximate location of the non-linear distortion source. Stated in a slightly different way, each user terminal's contribution to the distortion can be analyzed and determined.

Figure 7:
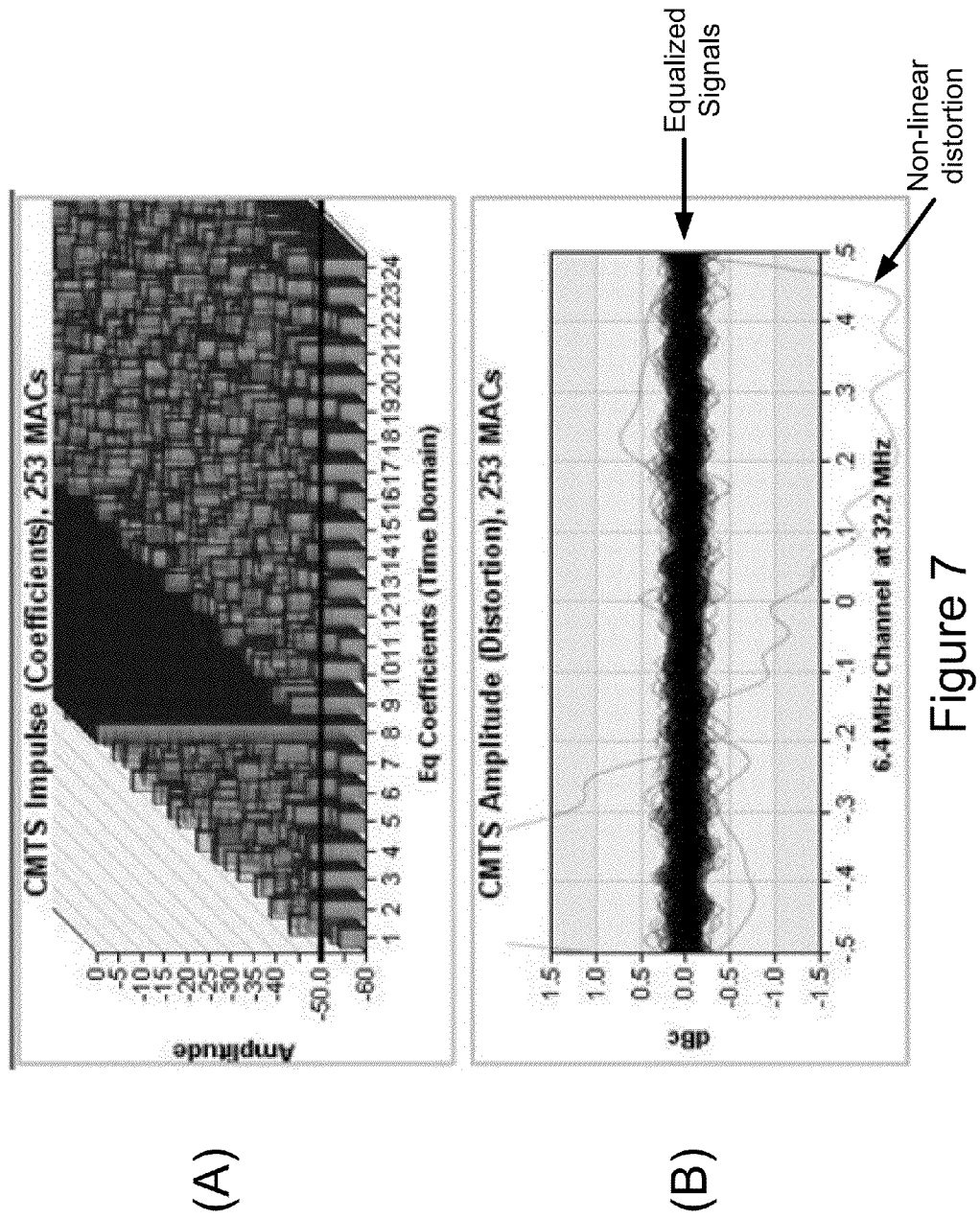
FIGS. 7A-7B illustrate examples of equalization coefficients and amplitude distortion in connection with one or more aspects of this disclosure.

FIG. 7A illustrates an example of sets of equalization coefficients for a plurality of user terminals (e.g., modems) as obtained from a TS. In particular, FIG. 7A shows twenty-four (24) taps along the horizontal axis, and amplitudes corresponding to each of the taps on the vertical axis. As shown, the majority of the energy of the signals is located in the reference or main-tap position #8. FIG. 7B represents the signals received from the user terminals in terms of amplitude (along the vertical axis) relative to frequency (along the horizontal axis). A majority of the received signals reside within ±0.5 band of 0.0 dBc as shown (as indicated by the heavier, darker bands near 0.0 dBc), and is likely indicative of effective equalization of any linear distortion source(s) that may have been present. Some of the received signals demonstrate large magnitudes and changes in terms of amplitude, which may be indicative of a non-linear distortion, as shown. While not shown in FIG. 7, a plot of the phase (similar to that shown in FIG. 7B for amplitude) could also be generated and analyzed.

Figure 8:
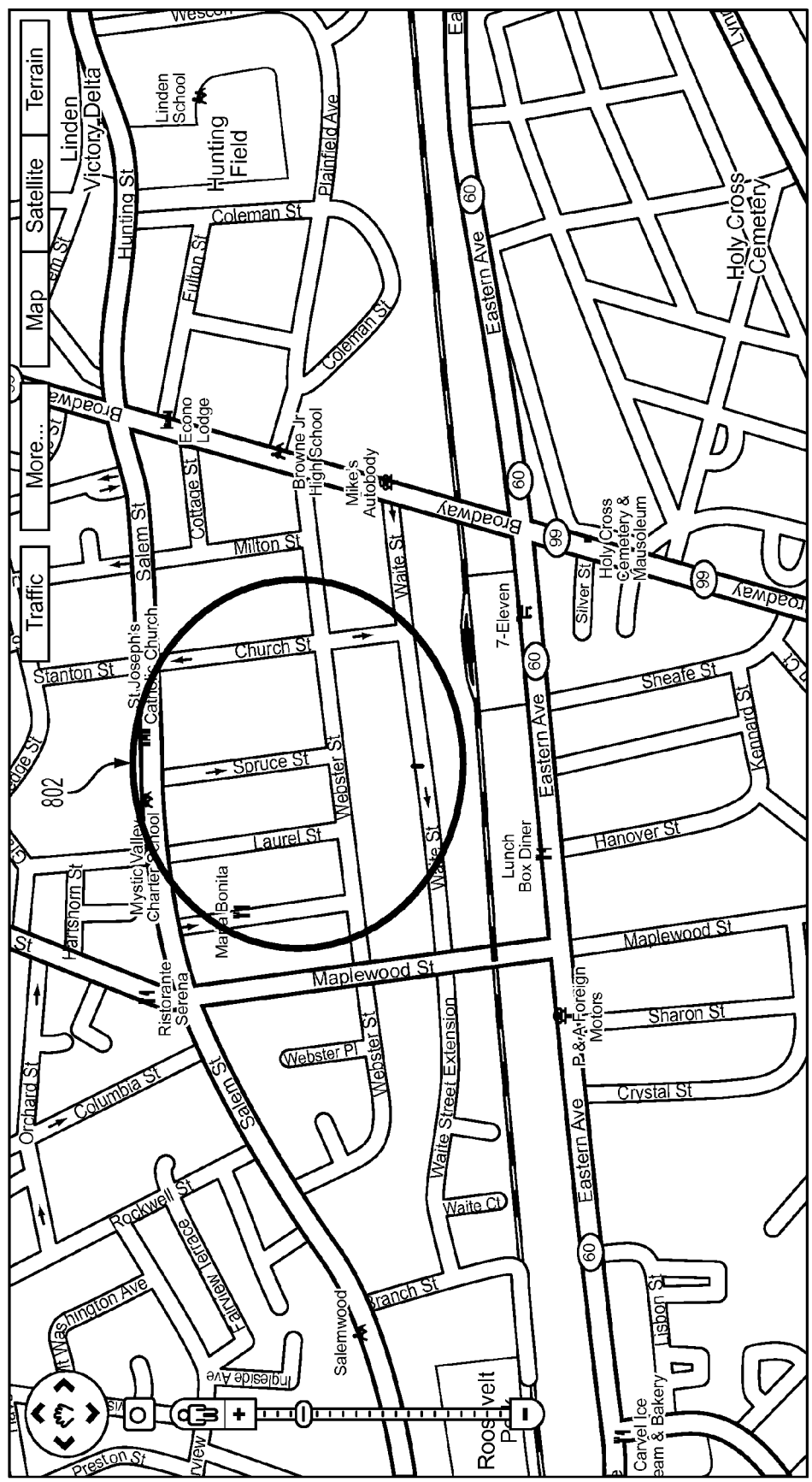
FIG. 8 illustrates a map in connection with one or more aspects of this disclosure.

An analysis may be conducted to identify the user terminals that appear to be subject to non-linear distortion. For example, a device (such as a TS) may maintain a table of responses with an entry for each user terminal, where each user terminal or device may be identified by an identifier, such as a MAC address. Once the user terminals have been identified, relationships between the terminals can be formulated or postulated in an effort to pinpoint the source of the non-linear distortion. For example, FIG. 8 illustrates a scenario where the identified user terminals are correlated to their geographic location (e.g., by way of user account information). In the scenario depicted in FIG. 8, all of the user terminals that are subject to non-linear distortion are located within circle 802. Armed with the knowledge of the geographic location(s) impacted by the non-linear distortion, a layout specific to the impacted terminals may be analyzed (e.g., compared) to determine the likely source(s) of the non-linear distortion. In the scenario associated with FIG. 8, all of the user terminals located within circle 802 may be connected to a TS by way of an amplifier 904 near the corner of Church Street and Webster Street as shown in FIG. 9.

Figure 9:
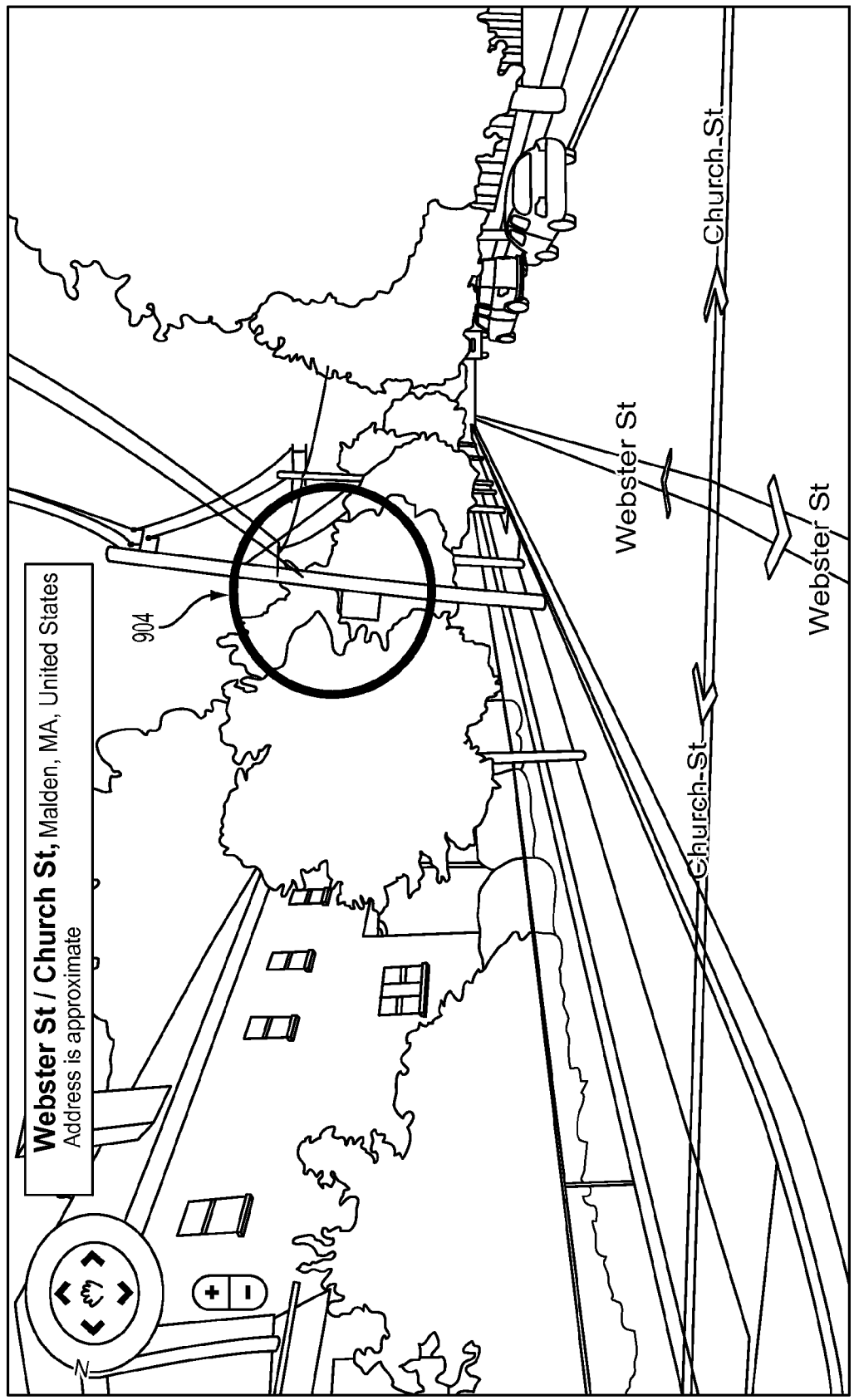
FIG. 9 illustrates a device suitable for demonstrating one or more aspects of this disclosure.

The scenarios depicted in FIGS. 7-9 are illustrative. Distortion sources (particularly non-linear distortion sources such as ingress and noise) may cause signal impairments that may manifest themselves in any number of ways, in networks of various topologies or layouts. The techniques described herein may provide a starting point or baseline for diagnosing an issue or problem by prioritizing where to look first. Based on the foregoing description, a line operator or technician may be able to determine or pin-point the likely location of a non-linear distortion source without having to have knowledge of the internal configuration of the user terminals or the TS. Problems or issues that previously would have remained unresolved, or taken teams of personnel weeks or even months to fix, may be reduced to a simple task conducted by a single person taking on the order of half an hour.

Figure 10:
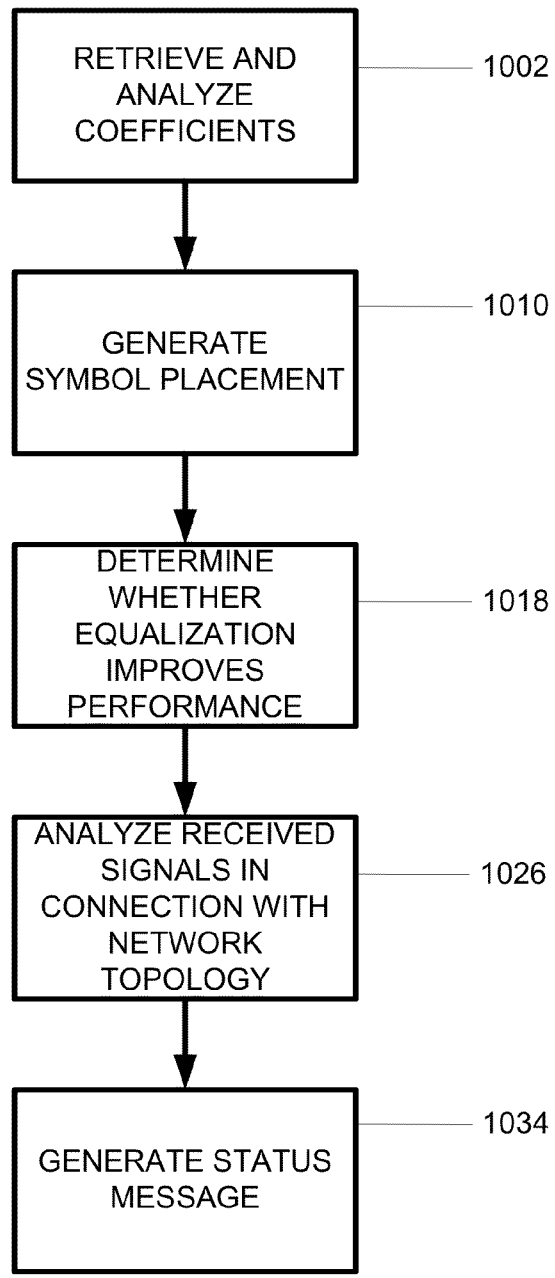
FIG. 10 illustrates a method suitable for demonstrating one or more aspects of this disclosure.

FIG. 10 illustrates a method that may be used to practice one or more aspects of this disclosure. In step 1002, equalization coefficients may be retrieved and analyzed to determine a communication channel's amplitude and/or phase response over an operating frequency range. The equalization coefficients may be obtained from a user terminal, from a TS, from a storage device (e.g., a database), or any other device that may be used to store the equalization coefficients.

In step 1010, a symbol placement may be generated or synthesized based on the coefficients retrieved and analyzed in step 1002. In this manner, service personnel, a line operator, analyses software, or the like may obtain insight into the underlying performance of the modulation/demodulation from a pre-equalization perspective. Moreover, such a symbol generation lends itself to testing all possible combinations of symbols without having to actually exercise the associated hardware/software/firmware (e.g., without having to actually transmit or receive those symbols). Constellation diagrams similar to the ones shown in FIGS. 4B-4D may be generated and/or displayed on a display device in conjunction with step 1010.

While not shown in FIG. 10, multiple iterations of coefficient retrieval/analysis (step 1002) and symbol generation (step 1010) may be conducted over time to obtain a scatter of transmission performance over time. Such multiple iterations may be conducted using a time-based loop in a program executing on one or more computers or computing platforms.

In step 1018, a determination may be made whether the equalization is effective in reducing distortion (in terms of amplitude and/or phase) over a (predetermined period of) time. For example, equalization may have a tendency to average-out signal distortions caused by a linear distortion source. If the equalization is ineffective in eliminating or reducing the distortion below a threshold level within a threshold amount of time, a determination may be made that it is likely or probable that a non-linear distortion source is present.

In step 1026, signals received from a plurality of user terminals may be analyzed (e.g., compared) in an effort to establish a relationship between those user terminals that may be experiencing signal impairment above a threshold level. For example, as described above with respect to FIGS. 7-9, a geographic location of user terminals experiencing signal impairment above a threshold level may be determined, and a network topology may be studied or compared to determine what those user terminals have in common relative to those user terminals that are not experiencing the signal impairment. In this manner, probable or likely source(s) of the non-linear distortion may be identified.

In step 1034, one or more status messages may be generated. The status message may indicate those symbols that are most likely to be subject to demodulation error at a receiver. For example, the equalization coefficients may be analyzed to determine which pre-equalization symbols are closest to or within a threshold distance of the decision boundaries associated with the transmission scheme used. In this manner, a (sub)set of candidate input symbols may be generated to facilitate testing or troubleshooting in the event of a reported error or failure.

The status message(s) of step 1034 may also provide a distance from a user terminal (or TS) to a likely source of a problem. For example, a map similar to the one shown in FIG. 8 may be generated. In this manner, network management may be in a better position to determine the extent of a potential problem and the personnel and tools that may need to be allocated to address the potential problem. If the topology of the network or communication system is known in sufficient detail, the distance may be correlated to device(s) located at that distance. For example, in reference to FIG. 9, the status message may provide details regarding amplifier 904, such as amplifier 904's make and model number, its version/revision number, and any other information that may be useful in analyzing or troubleshooting the amplifier 904.

The status message(s) generated in step 1034 may include additional information that may be used to facilitate debugging or troubleshooting. For example, the TS may maintain a library or database of past issues or problems (with possible input from service personnel or the like) and the causes of those past problems. In this manner, the library or database may be consulted to identify not only the likely location of the problem or error, but the likely cause of the problem or error, thereby correlating a current issue with past issues and techniques used to resolve those past issues.

Having such knowledge in advance of going to the site of the problem may enable service personnel to pack appropriate tool sets and may facilitate the selection of service personnel (e.g., if correcting the problem entails a specific skill set, one service technician could be selected over another).

The status message(s) generated in step 1034 may be conveyed in one or more formats. For example, the status message may include an audio message (e.g., a broadcast over radio), an email, a text message, an image/video message, or the like. If a potential problem is located in the user's premises (e.g., the user's home), the status message may be conveyed to the user and may either request the user to schedule an appointment with service personnel, or if the problem is simple enough to correct (e.g., a loose connector), may provide the user with guidance (e.g., an instructional video) on how to fix the problem (e.g., how to alter a user terminal or a component associated with the user terminal).

While the above description was largely presented in the context of user terminals in communication with a TS, aspects of this disclosure may readily be applied to other contexts as well. For example, the qualities of peer to peer communication systems, (mobile) telephone communication systems, satellite communication systems, and the like may also be monitored and evaluated using the techniques described herein. Of course, the contexts described herein are merely illustrative. Additional contexts are well within the scope and spirit of this disclosure.

Although not required, various aspects described herein may be embodied as a method, a data processing system, or as a computer-readable medium storing executable instructions. Accordingly, those aspects may take the form of an entirely hardware embodiment, an entirely software embodiment, an entirely firmware embodiment, or an embodiment combining software, firmware and hardware aspects. The functionality may be resident in a single computing device, or may be distributed across multiple computing devices/platforms, the multiple computing devices/platforms optionally being connected to one another via one or more networks. In addition, various signals representing data or events as described herein may be transferred between a source and a destination in the form of electromagnetic waves traveling through signal-conducting media such as metal wires, optical fibers, and/or wireless transmission media (e.g., air and/or space). In some embodiments, one or more transitory and/or non-transitory media may include instructions that, when executed by one or more computers or apparatuses, cause the one or more computers or apparatuses to perform the methodological acts and processes described herein.

As described herein, the various methods and acts may be operative across one or more computing servers and one or more networks. The functionality may be distributed in any manner, or may be located in a single computing device (e.g., a server, a client computer/user terminal, etc.). As discussed herein, timing and frequency information related to communications between two or more devices may be obtained across various data, television, telephone, and computer networks, and both proactive and reactive support in the presence of potential problems or actual errors is provided for. Moreover, upstream spectrum analysis capabilities are provided to operations and support personnel who would not normally have access to analyzer hardware. Visibility into upstream channels may be obtained without added expense. The analysis into the upstream channel performance may be conducted on a non-invasive basis, thereby eliminating or mitigating impact on user service. For example, service personnel (or other persons) may obtain insight into the relative health and performance of the modulation/demodulation without having to turn off an equalizer or equalizer functionality at a user terminal. The techniques described may be used to determine the likely existence of a non-linear distortion source and its location. Moreover, the techniques described herein may require fewer resources (e.g., service personnel, tool sets, etc.) relative to the techniques that were previously used.

As described herein, the methodological acts and processes may be tied to particular machines or apparatuses. For example, as described herein, a user terminal, such as a STB, computer, or modem, may equalize a signal prior to transmitting the signal to a receiving device (e.g., a TS). The coefficients used to perform that equalization may be (repeatedly) retrieved and analyzed from one or both of the user terminal and the receiving device. More generally, one or more computers may include one or more processors and memory storing instructions, that when executed, perform the methodological acts and processes described herein. Furthermore, the methodological acts and processes described herein may perform a variety of functions including transforming an article (e.g., equalization coefficients in conjunction with a received signal) into a different state or thing (e.g., a likelihood of a symbol error or a measurement of how hard an equalization function is working at a user terminal to eliminate distortion, a synthesis of symbol placement in relation to a modulation/demodulation scheme used, a likely or approximate location of a potential problem or error, etc.).

The various embodiments and examples described above are, as stated, merely examples. Many variations may be implemented to suit a particular implementation, and the various features may be combined, divided, rearranged, omitted and/or augmented as desired. The scope of this patent should not be limited by any of the specific examples described herein.

What is claimed is:

1. A method comprising:
retrieving a first set of equalization coefficients; and
generating, by a computing device, a symbol placement associated with a transmission scheme based on the first set of equalization coefficients;
retrieving a second set of equalization coefficients subsequent to retrieving the first set of equalization coefficients; and
updating the symbol placement associated with the transmission scheme responsive to retrieving the second set of equalization coefficients.

2. The method of claim 1, further comprising:
generating a constellation pattern based on the symbol placement.

3. The method of claim 2, further comprising:
displaying the generated constellation pattern on a display device.

4. The method of claim 1, further comprising:
transmitting to a user terminal, based on the generated symbol placement, at least one of:
(1) a request to schedule an appointment, and (2) guidance on how to alter the user terminal or a component associated with the user terminal.

5. The method of claim 1, further comprising:
calculating at least one of a modulation error ratio (MER) and an error vector based on the symbol placement.

6. The method of claim 1, further comprising:
quantifying a distortion present in a communication channel in terms of at least one of amplitude over an operating frequency range and phase over the operating frequency range.

7. The method of claim 1, further comprising:
calculating, for at least one of a plurality of generated symbols included in the symbol placement, at least one distance relative to at least one of a plurality of corresponding ideal symbols; and
displaying the at least one calculated distance.

8. A method comprising:
determining that equalization is unable to reduce, within a predetermined amount of time. a signal impairment associated with a signal received from a user terminal below a threshold value; and
determining that a non-linear distortion source is present in a communication channel connected to the user terminal responsive to said determining that the equalization is unable to reduce the signal impairment associated with the signal received from the user terminal below the threshold value within the predetermined amount of time.

9. The method of claim 8, further comprising:
determining that equalization is unable to reduce, within the predetermined amount of time, a plurality of signal impairments associated with a plurality of signals received from each of a plurality of user terminals below the threshold value, the plurality of user terminals including the user terminal; and
comparing a layout associated with the plurality of user terminals relative to a layout associated with at least one other terminal to determine a probable location of the non-linear distortion source, wherein a signal received from the at least one other terminal is not impaired above the threshold value.

10. The method of claim 9, further comprising:
generating at least one status message comprising a map identifying a geographic region where the plurality of user terminals are located.

11. The method of claim 9, further comprising:
generating at least one status message comprising an identification of at least one device located at the probable location of the non-linear distortion source.

12. An apparatus comprising:
at least one processor; and
memory storing instructions that, when executed by the at least one processor, cause the apparatus to:
retrieve a set of equalization coefficients;
generate, based on the set of equalization coefficients, a symbol placement associated with a transmission scheme; and
transmit to a user terminal, based on the generated symbol placement, at least one of: (1) a request to schedule an appointment, and (2) guidance on how to alter the user terminal or a component associated with the user terminal.

13. The apparatus of claim 12, wherein the instructions, when executed by the at least one processor, cause the apparatus to:
generate a constellation pattern based on the symbol placement.

14. The apparatus of claim 13, further comprising:
a display device,
wherein the instructions, when executed by the at least one processor, cause the apparatus to:
display the constellation pattern on the display device.

15. The apparatus of claim 12, wherein the instructions, when executed by the at least one processor, cause the apparatus to:
calculate at least one of a modulation error ratio (MER) and an error vector based on the symbol placement.

16. The apparatus of claim 12, wherein the instructions, when executed by the at least one processor, cause the apparatus to:
quantify a distortion present in a communication channel between the apparatus and the user terminal in terms of at least one of amplitude over an operating frequency range and phase over the operating frequency range.

17. The apparatus of claim 12, wherein the transmission scheme comprises quadrature amplitude modulation.

18. The apparatus of claim 12, wherein the instructions, when executed by the at least one processor, cause the apparatus to:
identify a subset of symbols included in the symbol placement that are within a threshold distance of one or more decision boundaries.

19. The apparatus of claim 12, wherein the instructions, when executed by the least one processor, cause the apparatus to:
retrieve a second set of equalization coefficients subsequent to retrieving the set of equalization coefficients; and
update the symbol placement associated with the transmission scheme responsive to retrieving the second set of equalization coefficients.

* * * * *

UNITED STATES PATENT AND TRADEMARK OFFICE
CERTIFICATE OF CORRECTION

PATENT NO. : 8,693,530 B2  Page 1 of 1
APPLICATION NO. : 12/848262
DATED : April 8, 2014
INVENTOR(S) : Lawrence D. Wolcott et al.

It is certified that error appears in the above-identified patent and that said Letters Patent is hereby corrected as shown below:

In the Specification

Column 8, Detailed Description, Line 3:
  After "ratio.", please delete "¶"

Column 10, Detailed Description, Line 17:
  After "issues.", delete "¶"

In the Claims

Column 12, Claim 8, Line 27:
  In Claim 8, delete "time." and insert --time,--

Signed and Sealed this
Third Day of February, 2015

Michelle K. Lee
*Deputy Director of the United States Patent and Trademark Office*